(12) United States Patent
Chang et al.

(10) Patent No.: US 7,145,731 B2
(45) Date of Patent: Dec. 5, 2006

(54) STEPWISE VARIABLE ZOOM LENS SYSTEM

(75) Inventors: Kuo Wen Chang, Chung Ho (TW); Ming-Sen Tsao, Chung Ho (TW)

(73) Assignee: Nucam Corporation, Taipei County (TW)

( * ) Notice: Subject to any disclaimer, the term of this patent is extended or adjusted under 35 U.S.C. 154(b) by 17 days.

(21) Appl. No.: 11/072,522

(22) Filed: Mar. 7, 2005

(65) Prior Publication Data
US 2006/0198030 A1 Sep. 7, 2006

(51) Int. Cl.
*G02B 15/14* (2006.01)
(52) U.S. Cl. ..................... 359/689; 359/683
(58) Field of Classification Search .......... 359/689, 359/683, 685
See application file for complete search history.

(56) References Cited

U.S. PATENT DOCUMENTS

| 5,087,988 A | * | 2/1992 | Nakayama | 359/689 |
| 6,853,503 B1 | * | 2/2005 | Nomura et al. | 359/699 |
| 2002/0191305 A1 | * | 12/2002 | Nagatoshi | 359/689 |

* cited by examiner

*Primary Examiner*—Jordan M. Schwartz
(74) *Attorney, Agent, or Firm*—Rosenberg, Klein & Lee (57) ABSTRACT

A stepwise variable zoom lens system for creating an image of a scene on an image sensor includes a first lens unit which has a positive refracting power, an aperture, a second lens unit which has a positive refracting power, and a third lens unit which has a negative refracting power. Each of the first, the second and the third lens units is constructed from a single block. The third lens unit is fixed. The first and the second lens units are selectively positioned in a first position and a second position, and the position is changed from one to the other by moving the first and the second lens units in opposite direction.

12 Claims, 6 Drawing Sheets

STEPWISE VARIABLE ZOOM LENS SYSTEM

FIELD OF THE INVENTION

The present invention relates to a zoom lens system. More particularly, the invention relates to a stepwise variable zoom lens system which has a short overall length and is suitable for relatively thin electronic equipments.

THE RELATED ART

In recent years, relatively thin electronic equipments with photographic function, such as simple cameras, mobile phones and PDAs, have been rapidly spread in the market. These electronic equipments have become so small that they require the imaging lenses to be configured therein be as short as possible in overall length and as simple as possible in structure.

In order to reduce the overall length of the imaging lens, one solution is that the lens is designed to have fixed focal length. One such lens was described in U.S. Pat. Pub. No. 2003/0210475 by Shinohara, issued on Nov. 13, 2003. However, the fixed focal length lens is incapable of varying the distance of vision during taking pictures. If a user wants to take views in different distances, the user must move forward and back, obviously which is boring and troublesome. A continuous variable focal length lens system that may adjust its focal length continuously to take views in different distances can overcome the aforementioned problem, but the zoom lens system with such function is generally composed of a large amount of lens components. The structure of the lens system is too complicated. Furthermore, such lens system needs a complicate and precise control mechanism to control different lens units moving along an optical axis to continuously vary focal length. The smaller the size of the lens system is desired to be, the more difficult the control is to achieve. Therefore, the continuous variable focal length lens system is not adapted to be used in these relatively thin equipments.

SUMMARY OF THE INVENTION

An object of the present invention is to provide a stepwise variable zoom lens system which has a short overall length, a simple and compact structure, and that is capable of stepwise varying focal length to take views in several different distances.

To achieve the above object, the present invention provides a stepwise variable zoom lens system. The stepwise variable zoom lens system includes a first lens unit which has a positive refracting power, an aperture, a second lens unit which has a positive refracting power, and a third lens unit which has a negative refracting power. Each of the first, the second and the third lens units is constructed from a single block. The first and the second lens units are selectively positioned in a first position and a second position, and the position is changed from one to the other by moving the first and the second lens units in opposite direction.

Composed of three single blocks as mentioned above, the lens system is simple and compact in structure. The lens system stepwise varies focal length by moving the first and the second lens units in opposite direction from the first position to the second position or from the second position to the first position to permit users to take views in two different distances. As the same reasons above, the lens system 100 has a short overall length.

BRIEF DESCRIPTION OF THE DRAWINGS

The present invention will be apparent to those skilled in the art by reading the following description of embodiments thereof, with reference to the attached drawings, in which.

DETAILED DESCRIPTION OF THE PREFERRED EMBODIMENT

Figure 1:
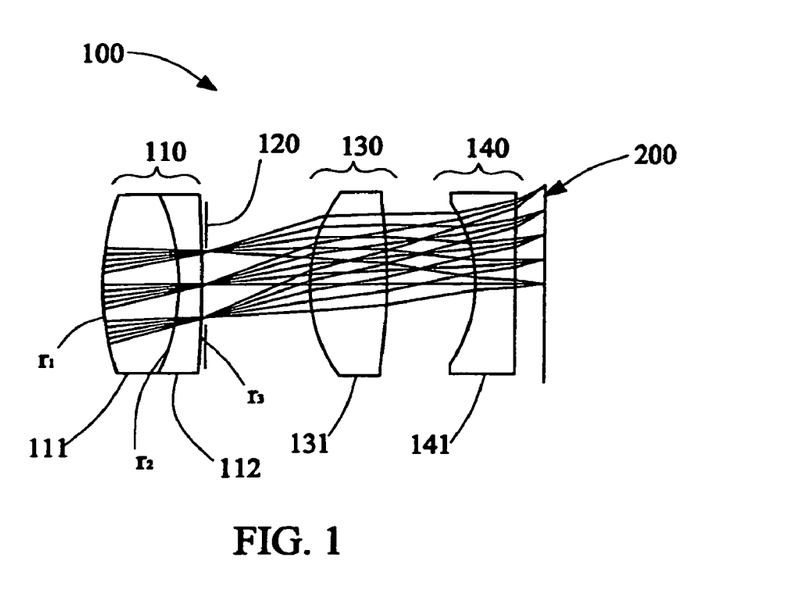
FIG. 1 is a cross-sectional view of a stepwise variable zoom lens system in a first position according to a first embodiment of the present invention.
Figure 2:
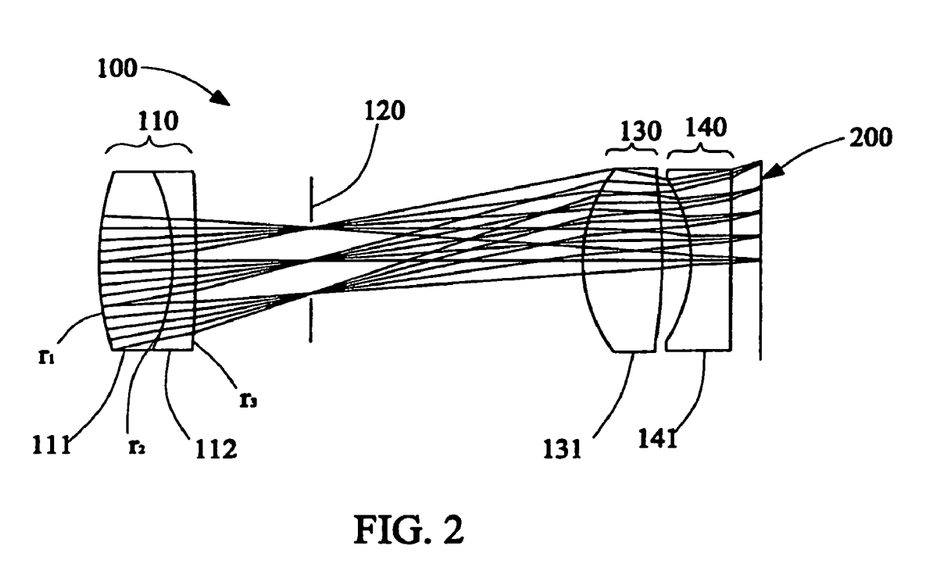
FIG. 2 is a cross-sectional view of the stepwise variable zoom lens system of FIG. 1 in a second position.
Figure 3A:
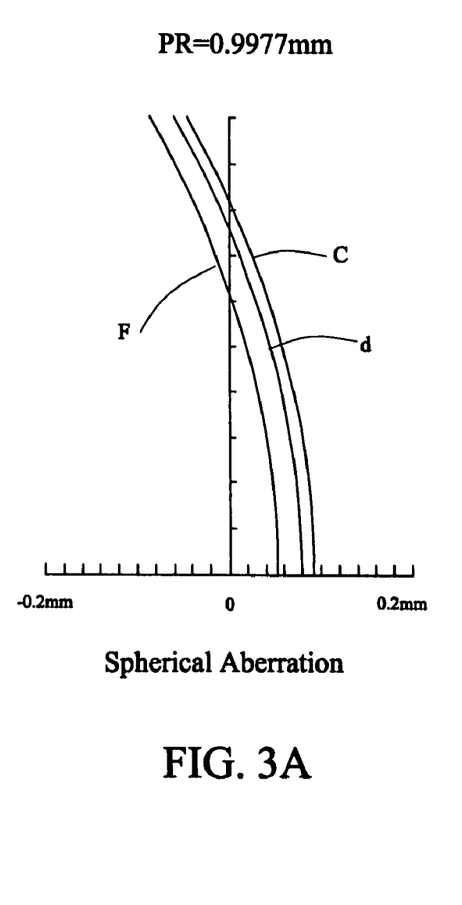
FIGS. 3A–3C show spherical aberration, astigmatism, and distortion, respectively, of the stepwise variable zoom lens system as shown in FIG. 1.
Figure 3B:
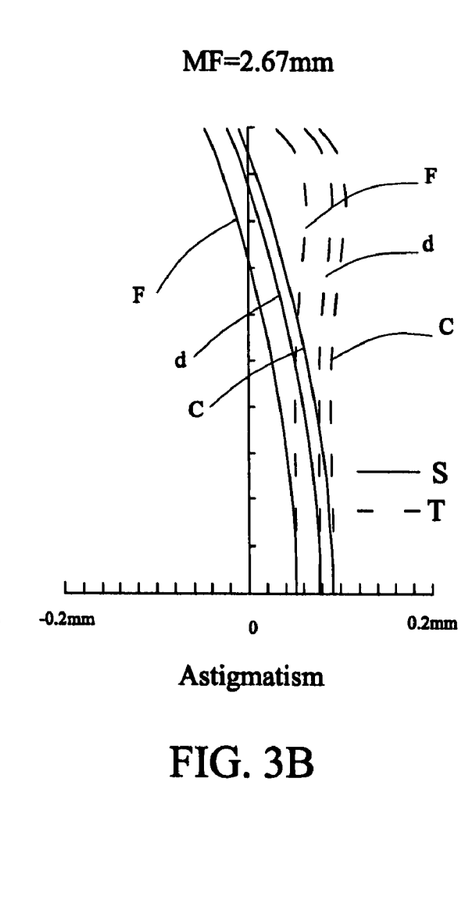
Figure 3C:
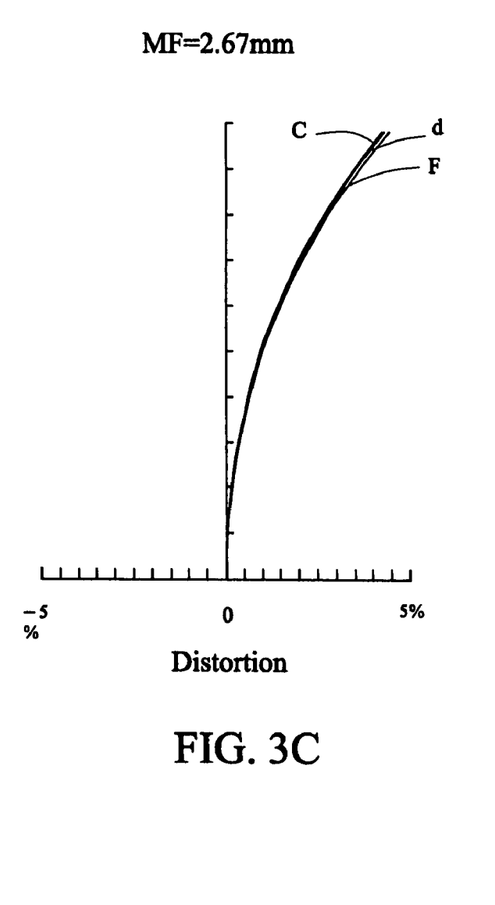
Figure 4A:
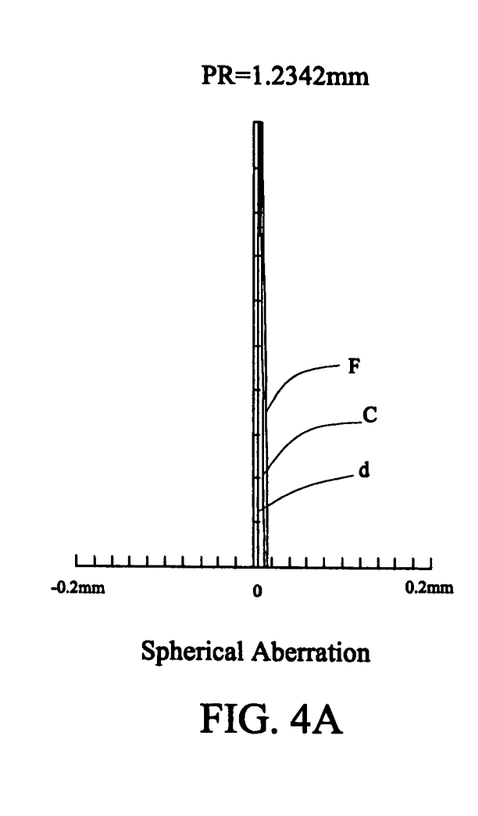
FIGS. 4A–4C show spherical aberration, astigmatism, and distortion, respectively, of the stepwise variable zoom lens system as shown in FIG. 2.
Figure 4B:
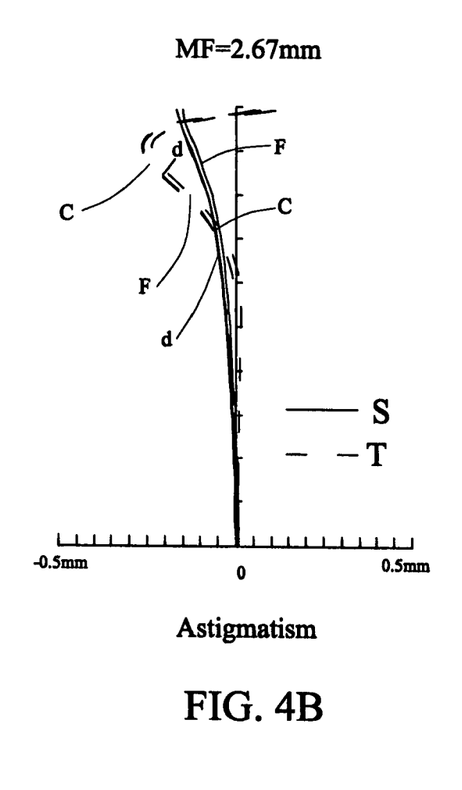
Figure 4C:
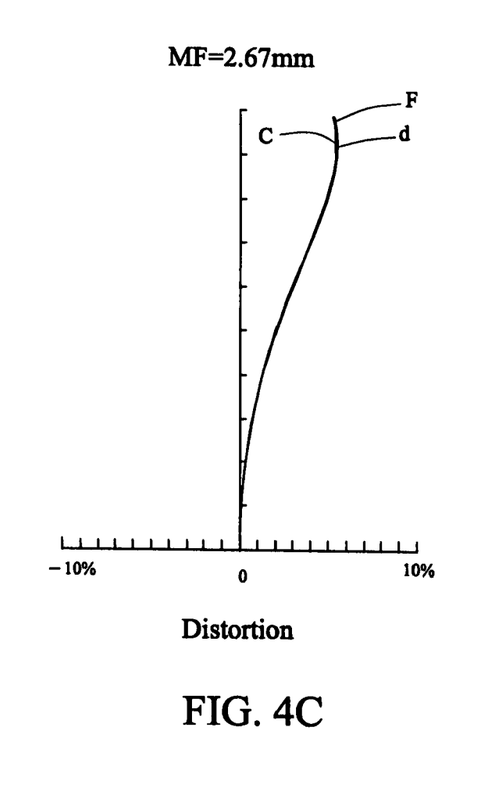

With reference to FIG. 1 and FIG. 2, a first embodiment of a stepwise variable zoom lens system 100 according to the present invention is shown. The stepwise variable zoom lens system 100 used to create an image of a scene on an image sensor 200 includes, in order from an object side, a first lens unit 110 having a positive refracting power, an aperture 120, a second lens unit 130 having a positive refracting power and a third lens unit 140 having a negative refracting power. Each of the lens units 110, 130 and 140 is constructed from a single block. The term "single block" is defined as (a) a single lens element or (b) a cemented lens composed of several lens elements cemented together or (c) a hybrid lens composed of a glass lens element and a thin resin layer pressed together. The aperture 120 has an opening for light passing through.

The first lens unit 110 is a cemented lens composed of a biconvex lens 111 and a negative concave-convex lens 112 adhered to each other. The first lens unit 110 is used to correct lateral color, field curvature and spherical aberration. In order to minimize spherical aberration further, the biconvex lens 111 is made of Crown Glass, and the negative concave-convex lens 112 is made of Flint Glass. In order to reduce field curvature, the curvature radii of the refracting surfaces of the cemented lens satisfy the following relation:

$$-\frac{3}{h}\sqrt{\frac{6p}{\phi}} \leq \frac{1}{r_1} + \frac{1}{5r_2} - \frac{1}{r_3} \leq -\frac{3}{h}\sqrt{\frac{6p}{\phi}}$$

wherein
 h denotes the image height,
 $\phi$ denotes the exit pupil diameter,
 p denotes the pixel size of the image sensor 200,
 $r_1$ denotes the curvature radius of the refracting surface of the biconvex lens 111 facing to the object side, $r_3$ denotes the curvature radius of the refracting surface of the negative concave-convex lens 112 facing to the image side, and $r_2$ denotes the curvature radius of the cemented surface of the cemented lens.

The second lens unit 130 is a biconvex positive lens 131 to further converge the light having passed through the first lens unit 110. In order to shorten overall length of the stepwise variable zoom lens system 100 as much as possible, the following condition is preferable to be satisfied:

$$1/3 < P2/P1 < 3$$

wherein

P2 denotes the refractive power of the second lens unit 130, and

P1 denotes the refractive power of the first lens unit 110.

Furthermore, in order to reduce the aberration, the biconvex lens 131 is made of Crown Glass, and both refractive surfaces of the biconvex lens 131 are aspheric. Each aspheric surface satisfies the following equation:

$$Z = \frac{cS^2}{1 + \sqrt{1-(K+1)c^2S^2}} + A_4S^4 + A_6S^6 + A_8S^8 + A_{10}S^{10} \quad \text{Equation (1)}$$

Wherein c designates a curvature of the aspheric vertex,

S designates a distance from the optical axis,

K designates the conic coefficient, $A_4$, $A_6$ $A_8$ and $A_{10}$ designates the fourth, sixth, eighth, and tenth aspheric coefficients, and Z designates the sag of a line drawn from a point on the aspheric lens surface at a distance S from the optical axis to the tangential plane of the aspheric surface vertex.

The third lens unit 140 is a concave-flat lens 141 which is used to correct the field curvature and reduce the chromatic aberration. The concave-flat lens 141 has a flat surface facing to the image side on which multiple coating as infrared cut off filter can be put easily. The multiple coating can cut off infrared rays for decreasing the influence of infrared rays on image sensor 200 and improving the correctness of color.

With reference to FIG. 1 and FIG. 2 again, the zooming process is shown in the following.

In the present invention, the third lens unit 140 does not move relative to the image sensor 200. The first and the second lens units 110, 130 are only disposed in the first position or the second position. In the present embodiment, the first position shows the wide-angle end, and the second position shows the telephoto end. When the first and the second lens units 110, 130 are placed in the first position, as shown in FIG. 1, the stepwise variable zoom lens system 100 has the shortest overall length. When the first and the second lens units 110, 130 are placed in the second position, as shown in FIG. 2, the stepwise variable zoom lens system 100 has the longest overall length. By moving the first and the second lens units 110, 130 from one position to the other, the focal length of the stepwise variable zoom lens system 100 is changed. This zoom mode is different from the continuous zoom mode which is mentioned in the related art. This mode is stepwise zoom mode, therefore the lens system is defined as stepwise variable zoom lens system.

In the zooming process of the foregoing description, the first and the second lens units 110, 130 are moved along the optical axis in an opposite direction, that is to say, when the first lens unit 110 is moved toward the object side, the second lens unit 140 is moved toward the image side, and vice versa. This moving mode can increase the distance between the first lens unit 110 and the second lens unit 130 to weaken the convergence of light, therefore, a relatively large zoom ratio is obtained. In the present embodiment, the zoom ratio is about 2.0.

The aperture 120 positions between the first lens unit 110 and the second lens unit 130. During zooming, the aperture 120 also moves along the optical axis. When the first and the second lens units 110, 130 are set in the first position, the aperture 120 almost contacts to the first lens unit 110. When the two lens units 110, 130 are set in the second position, the aperture 120 spaces both lens units 110, 130 a certain distance.

Composed of three single blocks as mentioned above, the lens system 100 is simple and compact in structure. The lens system 100 stepwise varies focal length by moving the first and the second lens units 110, 130 in opposite direction from the first position to the second position or from the second position to the first position to permit users to take views in two different distances. As the same reasons above, the lens system 100 can be designed short in overall length.

Table 1 below lists the surface number, in order from the object side, the radius of curvature r (in mm) of each optical surface at the optical axis, the distance d1 (in mm) between vertexes of adjacent optical surfaces when the first and the second lens unit 110, 130 are disposed in the first position, the distance d2 (in mm) between vertexes of adjacent optical surfaces when the first and the second lens unit 110, 130 are disposed in the second position, the Abbe number V and the refractive index n (at the d-line of $\lambda$=587.6 nm) of each lens element for the first embodiment

TABLE 1

| Surface | R | $d_1$ | $d_2$ | n | V | |
|---|---|---|---|---|---|---|
| 1 | 8.176 | 1.94 | 1.94 | 1.517 | 64.2 | |
| 2 | −5.919 | 0.59 | 0.59 | 1.620 | 36.4 | |
| 3 | −39.920 | 0.10 | 2.91 | | | |
| 4 | ∞ | 2.70 | 7.04 | | | Aperture |
| 5 | 6.244 | 2.02 | 2.02 | 1.530 | 55.9 | Aspheric |
| 6 | −6.387 | 2.26 | 0.75 | | | Aspheric |
| 7 | −4.193 | 1.00 | 1.00 | 1.847 | 23.8 | |
| 8 | ∞ | 0.75 | 0.75 | | | |

Table 2 below lists the values of the constants K, $A_4$, $A_6$ $A_8$ and $A_{10}$ used in Equation (1) above for each of the aspheric lens surfaces of Table 1.

TABLE 2

| | Surface | |
|---|---|---|
| | 5 | 6 |
| K | 2.604 | −4.974 |
| $A_4$ | 0.001677 | 0.002898 |
| $A_6$ | 0.000302 | 0.000591 |
| $A_8$ | 0.000048 | 0.000093 |
| $A_{10}$ | −0.000003 | −0.000005 |

FIGS. 3A–3C and FIGS. 4A–4C show spherical aberration, astigmatism, and distortion, respectively, of the stepwise variable zoom lens system in the first position and the second position, respectively, according to the first embodiment. PR in FIGS. 3A and 4A denotes the pupil radius of the stepwise variable zoom lens system 100. MF in FIGS.

3B–3C and 4B–4C denotes the maximum field of the stepwise variable zoom lens system 100. In FIGS. 3A–3C and FIGS. 4A–4C, d, F, and C denote d-line(λ=587.6 nm), F-line(λ=486.1 nm) and C-line(λ=656.3 nm) respectively. Line S shows astigmatism in the sagittal image, and line T shows astigmatism in the tangential image. It is apparent from the respective diagrams that excellent correction is made for the various aberrations and good imaging quality is obtained, although the stepwise variable zoom lens system has a simple structure.

Figure 5:
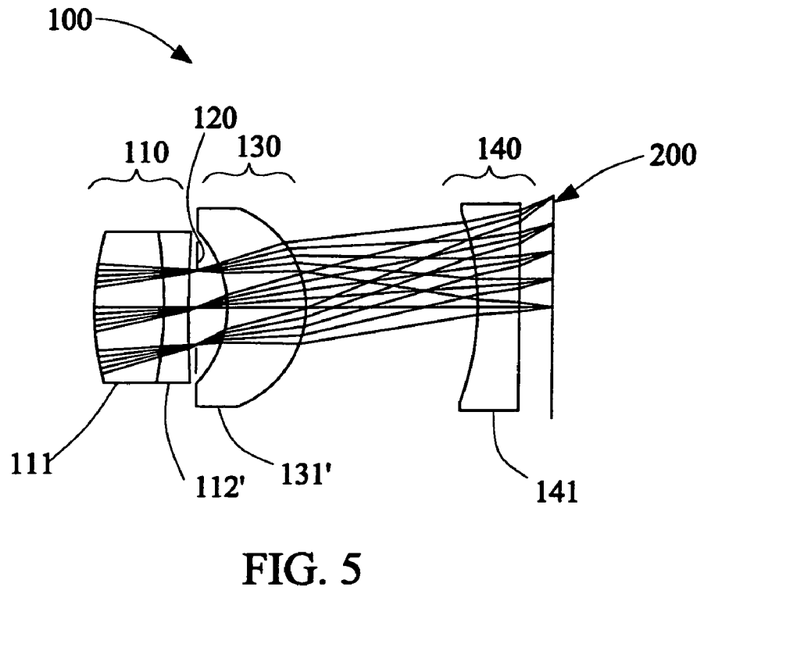
FIG. 5 is a cross-sectional view of a stepwise variable zoom lens system in a first position according to a second embodiment of the present invention.
Figure 6:
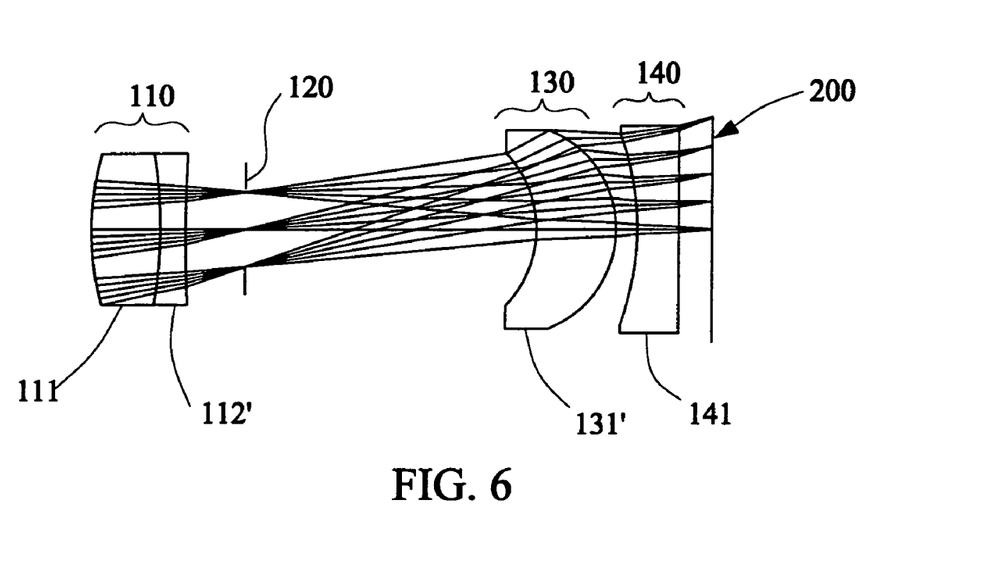
FIG. 6 is a cross-sectional view of the stepwise variable zoom lens system of FIG. 6 in a second position.
Figure 7A:
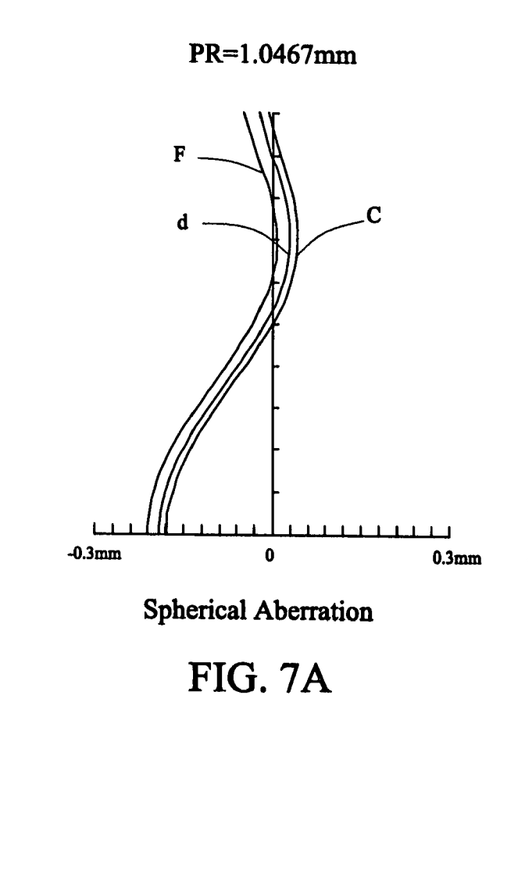
FIGS. 7A–7C show spherical aberration, astigmatism, and distortion, respectively, of the stepwise variable zoom lens system as shown in FIG. 5.
Figure 7B:
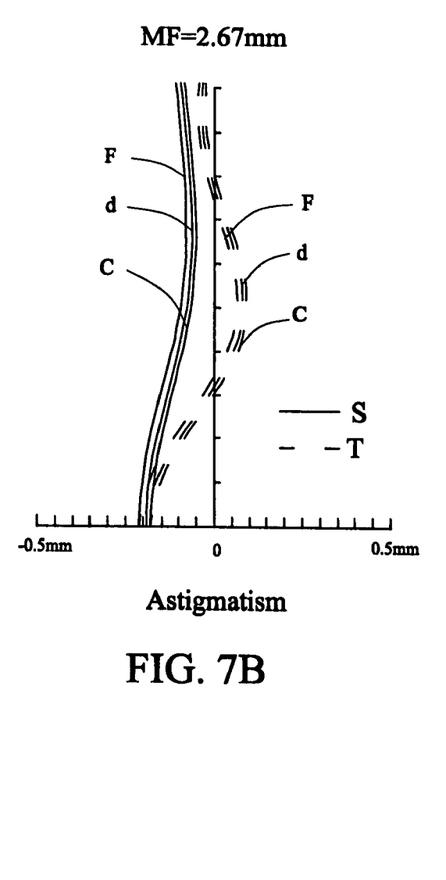
Figure 7C:
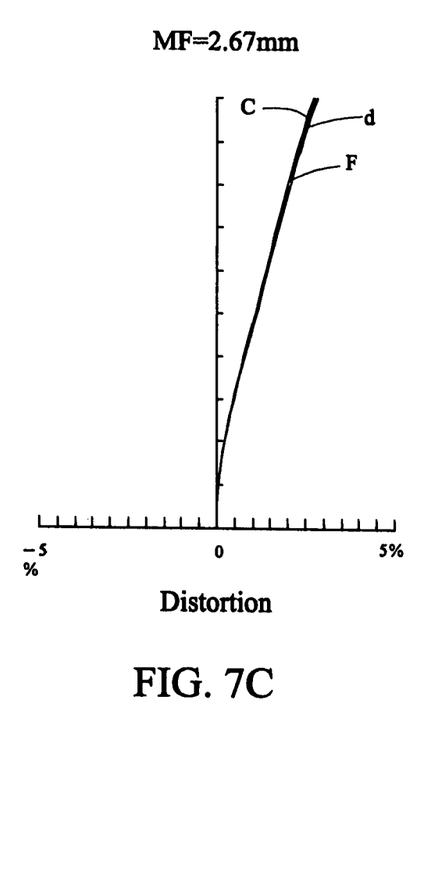
Figure 8A:
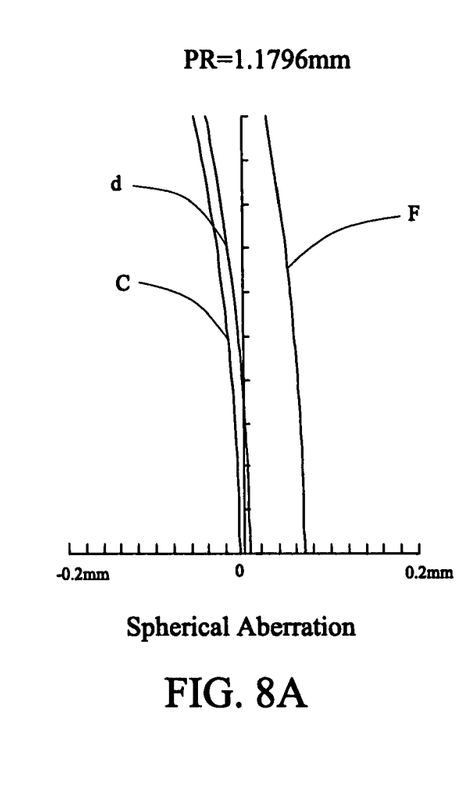
FIGS. 8A–8C show spherical aberration, astigmatism, and distortion, respectively, of the stepwise variable zoom lens system as shown in FIG. 6.
Figure 8B:
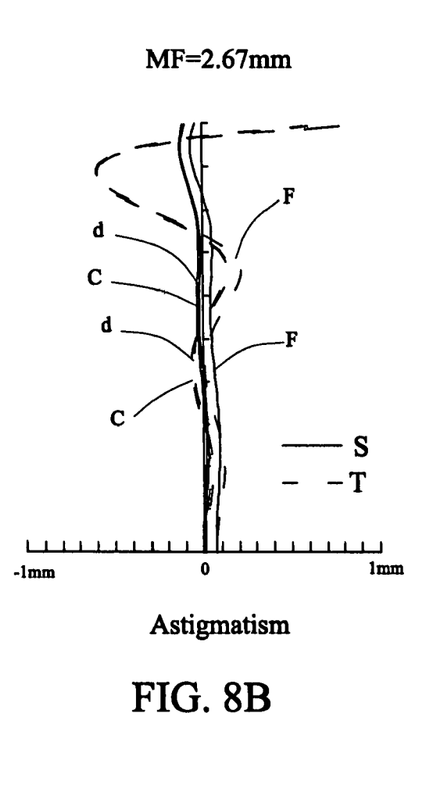
Figure 8C:
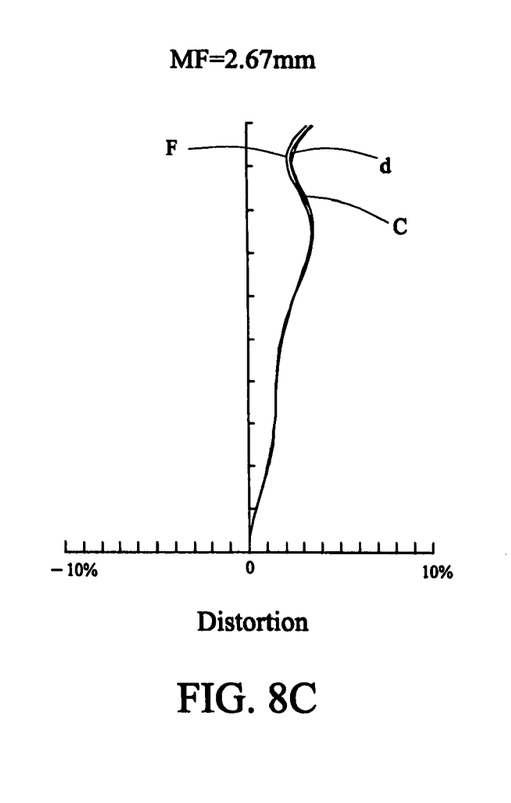

With reference to FIG. 5 and FIG. 6, a second embodiment is shown. The stepwise variable zoom lens system according to the second embodiment is similar to that shown in the first embodiment, the differences between which are that the cemented lens of the first lens unit 110 in the second embodiment is composed of a biconvex lens 111 and a biconcave lens 112', and that the second lens units 130 in the second embodiment is composed of a concave-convex lens 131'.

Since the zooming process of the stepwise variable zoom lens system in the second embodiment is identical to that shown in the first embodiment, a detailed description thereof is omitted herein.

Various values of the second embodiment are list in the table 3 and the table 4, wherein the same symbols stand for the same meanings as shown in the first embodiment.

TABLE 3

| Surface | r | $d_1$ | $d_2$ | n | V | |
|---|---|---|---|---|---|---|
| 1 | 6.760 | 1.65 | 1.65 | 1.713 | 53.8 | |
| 2 | −10.797 | 0.60 | 0.60 | 1.805 | 25.4 | |
| 3 | 35.208 | 0.20 | 1.43 | | | |
| 4 | ∞ | 0.75 | 7.01 | | | Aperture |
| 5 | −4.789 | 1.90 | 1.90 | 1.530 | 55.9 | Aspheric |
| 6 | −2.557 | 4.12 | 0.52 | | | Aspheric |
| 7 | −6.451 | 1.00 | 1.00 | 1.847 | 23.8 | |
| 8 | ∞ | 0.80 | 0.80 | | | |

TABLE 4

| | Surface | |
|---|---|---|
| | 5 | 6 |
| K | 0 | −10 |
| $A_4$ | −0.021025 | −0.059387 |
| $A_6$ | 0.011641 | 0.017530 |
| $A_8$ | −0.007690 | −0.003618 |
| $A_{10}$ | −0.000890 | −0.000233 |

FIGS. 7A–7C and FIGS. 8A–8C show spherical aberration, astigmatism, and distortion, respectively, of the stepwise variable zoom lens system in the first position and the second position, respectively, according to the second embodiment. The same symbols in those figures stand for the same meanings as shown in the first embodiment. It is apparent from the respective diagrams that excellent correction is made for the various aberrations and good imaging quality is obtained.

As will be apparent to those skilled in the art according to the foregoing disclosure, many alterations and modifications, for example, the concave-convex lens 112 or the biconcave lens 112' is substituted with a concave-flat lens, and the biconvex lens 131 or the concave-convex lens 131' is cemented with a negative lens in the surface facing to the image side, are possible in the practice of the present invention without departing from the spirit or scope thereof.

What is claimed is:

1. A stepwise variable zoom lens system adapted to create an image of a scene on an image sensor, in order from an object side, comprising:
   a first lens unit which has a positive refracting power;
   an aperture for light passing through;
   a second lens unit which has a positive refracting power; and
   a third lens unit which has a negative refracting power;
   wherein each of said first, second and third lens units is constructed from a single block; said third lens unit is fixed; said first and second lens units are selectively positioned in a first position and a second position, and the position is changed from one to the other by moving said first and second lens units in opposite direction.

2. The stepwise variable zoom lens system as claimed in claim 1, wherein the first lens unit is a cemented lens composed of a positive lens and a negative lens adhered to each other, and the curvature radii of the refracting surfaces of the cemented lens satisfy the following relation:

$$-\frac{3}{h}\sqrt{\frac{6p}{\phi}} \le \frac{1}{r_1} + \frac{1}{5r_2} - \frac{1}{r_3} \le -\frac{3}{h}\sqrt{\frac{6p}{\phi}}$$

wherein
h denotes the image height,
φ denotes the exit pupil diameter,
p denotes the pixel size of the image sensor,
$r_1$ denotes the curvature radius of the refracting surface of the positive lens facing to the object side,
$r_3$ denotes the curvature radius of the refracting surface of the negative lens facing to the image side, and
$r_2$ denotes the curvature radius of the cemented surface of the cemented lens.

3. The stepwise variable zoom lens system as claimed in claim 2, wherein said cemented lens includes a biconvex positive lens and a concave-convex negative lens and said second lens unit is composed of a biconvex positive lens.

4. The stepwise variable zoom lens system as claimed in claim 3, wherein refracting surfaces of said biconvex positive lens of the second lens unit are aspheric surfaces.

5. The stepwise variable zoom lens system as claimed in claim 2, wherein said cemented lens includes a biconvex positive lens and a biconcave negative lens, and said second lens unit is composed of a concave-convex positive lens.

6. The stepwise variable zoom lens system as claimed in claim 5, wherein refracting surfaces of said concave-convex lens of the second lens unit are aspheric surfaces.

7. The stepwise variable zoom lens system as claimed in claim 2, wherein said cemented lens includes a biconvex positive lens and a concave-flat negative lens, and said second lens unit is a cemented lens.

8. The stepwise variable zoom lens system as claimed in claim 7, wherein said cemented lens of the second lens unit includes a biconvex positive lens and a negative lens.

9. The stepwise variable zoom lens system as claimed in claim 7, wherein said cemented lens of the second lens unit includes a concave-convex positive lens and a negative lens.

10. The stepwise variable zoom lens system as claimed in claim 1, wherein said third lens unit is composed of a concave-flat negative lens.

11. The stepwise variable zoom lens system as claimed in claim 10, wherein said concave-flat lens of the third lens unit is plated with a multi-layer infrared coating on the surface facing to the image side thereof.

12. The stepwise variable zoom lens system as claimed in claim 1, wherein the refractive power of the first lens unit and the second lens unit satisfy the following relation:

$$1/3 < P2/P1 < 3$$

wherein

P2 denotes the refractive power of the second lens unit, and

P1 denotes the refractive power of the first lens unit.

* * * * *